United States Patent [19]

Zaitsu et al.

[11] Patent Number: 4,807,077
[45] Date of Patent: Feb. 21, 1989

[54] SHORT TIME RECORDING TAPE CASSETTE HAVING A LARGER OPEN SPACE THAN THAT OF A LONG TIME RECORDING TAPE CASSETTE

[75] Inventors: Osamu Zaitsu, Neyagawa; Satoshi Kikuya, Hirakata, both of Japan

[73] Assignee: Matsushita Electric Industrial Co., Ltd., Osaka, Japan

[21] Appl. No.: 90,409

[22] Filed: Aug. 28, 1987

Related U.S. Application Data

[63] Continuation of Ser. No. 700,466, Feb. 11, 1985, abandoned.

[30] Foreign Application Priority Data

Feb. 16, 1984 [JP] Japan .................................. 59-27535
May 7, 1984 [JP] Japan .............................. 59-66290[U]

[51] Int. Cl.$^4$ .................... G11B 23/02; G11B 5/008; G11B 15/00; G11B 17/00
[52] U.S. Cl. .................................. 360/132; 360/93; 360/95; 360/85; 242/19
[58] Field of Search ............................ 360/132, 84–85, 360/94–95, 137, 90–93; 242/197–199

[56] References Cited

U.S. PATENT DOCUMENTS

| | | | |
|---|---|---|---|
| 2,971,716 | 2/1961 | Sampson | 360/132 |
| 3,377,437 | 4/1968 | Probst | 360/132 |
| 3,892,727 | 7/1975 | Carvajal et al. | 360/132 |
| 4,072,992 | 2/1978 | Leshik | 360/132 |
| 4,091,426 | 5/1978 | Umeda | 360/132 |
| 4,185,307 | 1/1980 | Sato | 360/94 |
| 4,306,690 | 12/1981 | Izaki et al. | 360/132 |
| 4,343,024 | 8/1982 | Kawai | 360/132 |
| 4,380,032 | 4/1983 | Pfost | 360/132 |
| 4,469,292 | 9/1984 | Mangold | 242/199 X |
| 4,490,757 | 12/1984 | Mogi | 360/94 |
| 4,524,926 | 6/1985 | Nemoto et al. | 360/132 |
| 4,529,149 | 7/1985 | d/alayer de C.d'Arc | 242/199 X |
| 4,536,810 | 8/1985 | Umeda | 360/94 |

FOREIGN PATENT DOCUMENTS

| | | | |
|---|---|---|---|
| 2313007 | 9/1973 | Fed. Rep. of Germany | 360/132 |
| 3415808 | 10/1984 | Fed. Rep. of Germany | 360/132 |
| 0538120 | 1/1978 | Japan | 360/132 |
| 55-45172 | 3/1980 | Japan | 360/94 |
| 58-128068 | 7/1983 | Japan | 360/132 |
| 59-171070 | 9/1984 | Japan | 360/132 |
| 6802575 | 8/1969 | Netherlands | 360/132 |

*Primary Examiner*—Stuart N. Hecker
*Assistant Examiner*—Alfonso Garcia
*Attorney, Agent, or Firm*—Stevens, Davis, Miller & Mosher

[57] ABSTRACT

Disclosed is a tape cassette for short-time recording having an interchangeability with a long-playing standard tape cassette. The short-time cassette has the external size and functions substantially the same as that of the standard tape cassette. The casing of the short-time tape cassette is provided with a large aperture the area of which is made larger than that of an aperture formed in the bottom of the standard tape cassette, owing to the reduction in the diameters of the reel flanges. With this arrangement, it is possible to accommodate the mechanism including the tape path within the outside dimensions of the tape cassette, thus allowing miniaturization of the mechanism of the apparatus which handles the tape. At the same time, a perfect interchangeability between the short-time tape cassette and the standard tape cassette is obtained, so that users can operate both types of the tape cassette on an identical player such as a VTR.

2 Claims, 20 Drawing Sheets

SHORT TIME RECORDING TAPE CASSETTE HAVING A LARGER OPEN SPACE THAN THAT OF A LONG TIME RECORDING TAPE CASSETTE

This application is a continuation of application Ser. No. 700,466 filed Feb. 11, 1985, now abandoned.

BACKGROUND OF THE INVENTION

The present invention relates to a tape cassette for short-time recording, suitable for use in a device such as a video tape recorder, in which signals are recorded in and reproduced from a recording tape wound over a predetermined portion of a circumference of a tape guide drum incorporating a transducer.

Video tape recorders (referred to as "VTR", hereinunder) have spread remarkably. In order to use portable VTRs for the purpose of outdoor recording and playback, reduction in size and weight is an important subject for the comfort of the user who handles the portable VTR outdoors. Without doubt, the tendency of the reduction in size and weight of video cameras and electric circuits will be further enhanced owing to the current effort for the reduction in the size of parts and to wide use of semiconductor parts.

On the other hand, the size of the mechanism of VTR is limited by the size of a tape cassette and the diameter of a tape guide drum. Practically, however, the effort for the reduction in the size of the VTR mechanism encounters a limit due to the size of the tape cassette and the diameter of the tape guide drum. In the modern VTRs, a tape cassette is positioned in the same plane as a tape guide drum at a predetermined distance from the latter, and tape is extracted from the cassette and wound round the tape guide drum by a specific mechanism. The reduction in size is limited also by the design of this mechanism. In order to reduce the size of this mechanism, a short-time recording tape cassette referred to as "VHS-C" has been proposed for VHS type video tape recorders. It has been also proposed to reduce the size of the tape guide drum by adopting so-called 1.5 head type or 4-head type drum, although such a drum is usable only for playback.

Thus, miniaturization of the VTR mechanism has been promoted through efforts to reduct the size of both the tape guide drum and the tape cassette. An explanation will be made hereinunder as to the practical measure for the reduction in the size of the tape cassette.

A tape cassette 202 of VHS-C type (referred to as "C-cassette", hereinunder) has a reel axis distance and a tape stretching position which are different from those of a standard long-playing tape cassette of VHS type (referred to as "standard tape cassette", hereinunder) as shown in FIG. 38. In order to provide interchangeability between the C-cassette and the standard tape cassette, it is a known measure to mount the C-cassette on an adapter cassette 201 having a maximum external size equal to that of the standard tape cassette. By using this adapter cassette, the reel axis distance and the tape running position which are the same as those of the standard tape cassette are obtained to make the C-cassette adaptable to the VTR designed for use in combination with the standard tape cassette. Needless to say, it is impossible to mount the standard tape cassette on a VTR designed for C-cassettes. The principal advantage of the adapter cassette type system represented by the VHS-C system resides in the miniaturization of the mechanism mentioned before. This system, however, involves the following problems or shortcomings.

(1) An expensive adapter cassette 201 is required for the mounting of the C-cassette on the VTR designed for the standard tape cassette. The user is obliged to purchase this expensive adapter cassette and to take a trouble of mounting the C-cassette into and out of the adapter cassette.

(2) For extracting the tape from the C-cassette 202 mounted on the adapter cassette 201 to the same position as that of the standard tape cassette, the front cover of the C-cassette in the adapter cassette 201 has to be kept opened. The front cover in the opening position is not allowed to project forwardly beyond the front edge of the adapter cassette 201. These requirements seriously limit the construction of the front cover of the C-cassette 202. In fact, existing C-cassettes are devoid of any sealing structure for sealing the tape and have no mechanism for locking the front covers.

(3) In the C-cassettes, the position of a feed reel 203 corresponds with the position of a feed reel in the standard tape cassette, in order to give a preference to the tension characteristics. A take-up reel 204 is constituted by a shaft provided in the C-cassette 202, such that it is driven through intermediate gears 205,206 in the adapter cassette 201. With this arrangement, under the influence of fluctuation in the meshing conditions of the gears 205 and 206, displays can be distorted and undesirable effects such as wow and flutter are produced.

Another proposal for miniaturization of the portable VTR employs a small-sized cassette without the use of the adapter cassette which causes all the problems mentioned above. This small-sized cassette is a $\frac{3}{4}$ inch cassette shown in FIG. 39, already used in broadcasting stations. A small-sized cassette 207 in question has the same reel-axis distance and tape running position as those of the standard tape cassettes 208. In this case, however, the diameter of a reel flange 209 is reduced by an amount corresponding to a short period of recording time, so that the width W of the cassette, as well as the distance D between the reel shaft and the rear surface of the cassette, is reduced to permit miniaturization of the cassette. This proposal, however, has the following shortcomings, although it can overcome the disadvantages of the adapter cassette type system mentioned before.

(1) For allowing two types of cassettes of different external sizes to be inserted in a VTR, the cassettes are formed at the bottom surfaces thereof with concaved guide recesses shown by broken lines in FIG. 39. This increases the cassette thickness unnecessarily.

(2) The cassette holder of the VTR must be provided with a guide protrubence for matching the guide recess in the cassettes. When the small-sized cassette is inserted into the VTR designed for the standard tape cassette, the cassette has to be inserted deeper into the VTR than in the case of the standard tape cassette 208, because the distance D between the reel shaft and the rear end surface of the cassette is smaller in this cassette than in the standard tape cassette. This considerably impairs the handling characteristics.

(3) With the small-sized cassette 207 inserted deeper into the cassette holder, withdrawal of the cassette is more difficult than insertion thereof. So, the user catches a notch 211 is formed in the center of the rear surface of the small-sized cassette to afford a holder for a finger for withdrawal. This operation is also very troublesome. For allowing a finger to enter the cassette holder and hold the small-sized cassette, there is naturally a limit on the size of the small-sized cassette. Namely, this withdrawing method is not possible unless the cassette has the thickness and size corresponding to the ¾ inch tape.

(4) Miniaturization of the small-sized tape cassette 207 on the basis of the standard tape cassette has a practical limit because this cassette has the same reel-axis distance and tape running position as the standard tape cassette. This proposal, therefore, is not so effective as the VHS-C system in the miniaturization of the mechanism.

These two proposals for the miniaturization of cassette, however, have respective merits and demerits, and are still unsatisfactory.

SUMMARY OF THE INVENTION

Accordingly, a primary object of the invention is to provide a short-time recording tape cassette which ensures interchangeability with a long-time recording standard tape cassette without the use of a troublesome adapter cassette, thus contributing to the miniaturization of the VTR mechanism.

A second object of the invention is to provide means for easy discrimination of a short-time recording tape cassette from a standard tape cassette when the short-time recording tape cassette is mounted on the VTR.

A third object of the invention is to make it possible to detect tape terminal ends of a short-time recording tape cassette with a minimal space occupied by detection means provided on the VTR and without increasing the number of the detecting means, while ensuring a perfect interchangeability between the short-time recording tape cassette and the standard tape cassette.

A fourth object of the invention is to allow the VTR to easily detect tape terminal ends of the short-time recording tape cassette without causing any increase in the number of parts while preventing dust and other foreign matter from entering into the tape cassette.

To this end, according to the invention, there is provided a tape cassette for short-time recording having an interchangeability with a standard tape cassette for a long-time recording, the standard tape cassette having a casing with a tape stretched on the front side thereof, the casing having a small aperture formed in the bottom thereof and accommodating a pair of large reels retaining the terminal ends of the tape, the pair of large reels being capable of being positioned at predetermined positions with a predetermined reel axis distance preserved therebetween, the tape cassette for short-time recording comprising: a casing having the same maximum external size substantially the same as that of the casing of the standard tape cassette and having a large aperture formed in the bottom thereof, the large aperture having a greater area than the small aperture and covering the region of the small aperture, the casing of the tape cassette for short-time recording accommodating a pair of small reels to which the terminal ends of a tape are secured, such that they are locatable at the predetermined positions with the same reel axis distance as the large reels.

DETAILED DESCRIPTION OF THE INVENTION

Embodiments of the invention will be described hereinunder with reference to the accompanying drawings.

Figure 1:
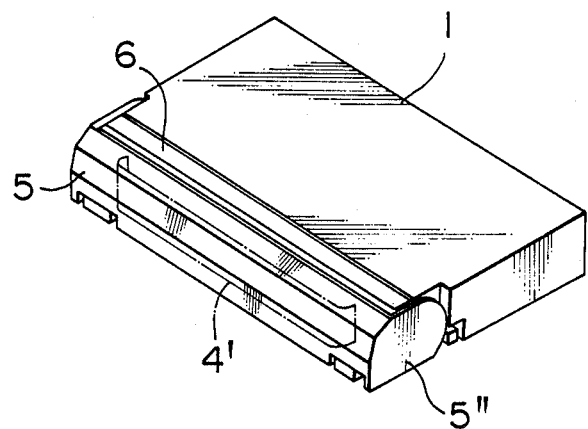
FIG. 1 is a perspective view of the top surface side of a standard tape cassette.
Figure 2:
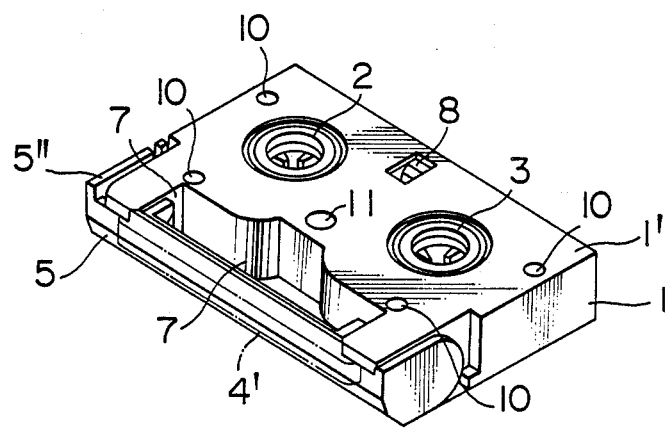
FIG. 2 is a perspective view of the reverse side of the standard tape cassette.
Figure 3:
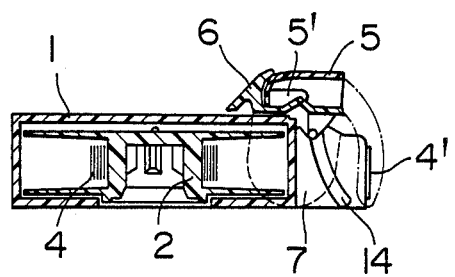
FIG. 3 is a sectional view of the standard tape cassette.
Figure 4:
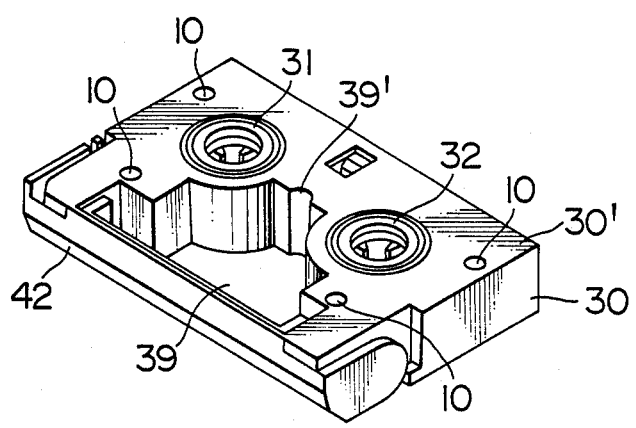
FIG. 4 is a perspective view of the reverse side of a short-time recording tape cassette n accordance with the invention.
Figure 5:
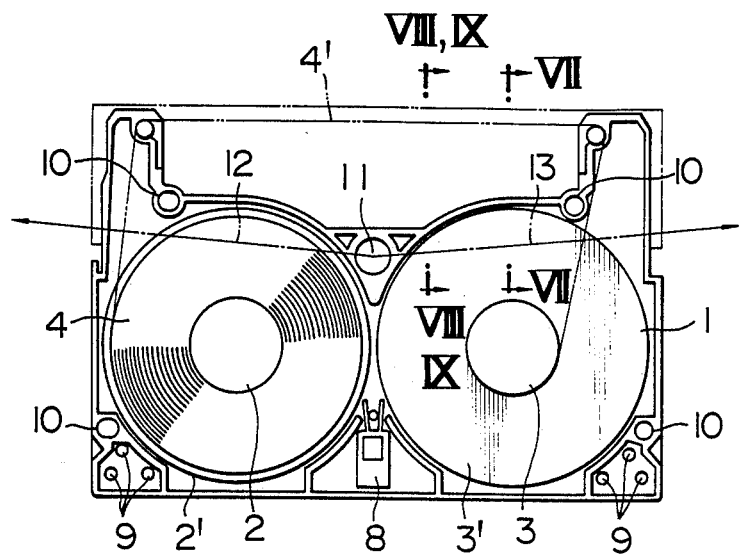
FIG. 5 is a plan view of the standard tape cassette.
Figure 6:
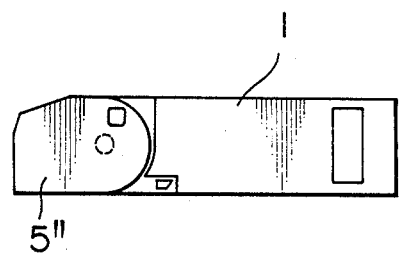
FIG. 6 is a side elevational view of the standard tape cassette.
Figure 39:
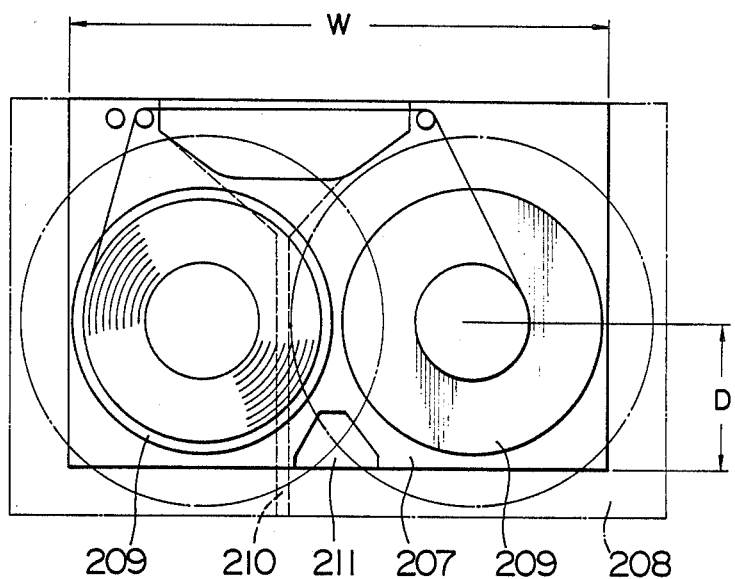

FIGS. 1 to 3, 5 and 6 illustrate a long-time recording standard tape cassette. The standard tape cassette has a general appearance as shown in FIG. 1 which is a perspective view. When the tape cassette is not used, a length of tape 4 (shown by one-dot-and-dash line in FIG. 2) is wound on a pair of reels 2,3 (see FIG. 2) and is stretched at the front side of the tape cassette 1. The stretched portion of the tape cassette 1 is covered by a front cover 5 and a rear cover 6. FIG. 2 is a perspective view of the standard tape cassette turned upside down from the position shown in FIG. 1. The standard tape cassette 1 is formed at its lower surface 1' with an aperture 7 through which a post or the like member is inserted into the space behind the stretched tape 4' to permit the same to be taken out. This aperture 7 is disposed within an area which is extended by an aperture 39 (see FIGS. 4 and 39) of a short-time recording tape cassette which will be explained later. The aperture 7, therefore, will be referred to as "small aperture", for the purpose of discrimination from the aperture 39. FIG. 3 shows the standard tape cassette 1 in which the front and rear covers 5 and 6 are opened by a cover opening and closing means provided on a VTR apparatus. FIG. 5 is a plan view schematically showing the internal structure of the standard tape cassette 1. As seen from this Figure, the standard tape cassette 1 has a reel lock 8 designed for taking up any slack in the tape 4 upon engagement with claws formed in the outer peripheries of flanges 2',3' formed on the reels 2,3 for the tape 4. Information such as thickness, type and length of the tape 4 is represented by the opening and closing conditions of information windows 9 formed in the lower surface 1' of the standard tape cassette. Reference numeral 10 designates positioning holes for positioning the standard tape cassette 1 on the body of the apparatus. Reference numeral 11 designates a sensor hole which receives a light-emitting or light-receiving element constituting a tape end detection means for detecting the terminal ends of the tape. The tape end detection means is adapted to detect the presence of detection tapes which are connected to both ends of the tape 4 and have a light transmission factor different from that of the tape 4. For instance, the light-emitting element forms a light path in the directions indicated by arrows 12 and 13, and there are provided light-receiving elements in the opposing relationship with the light-emitting elements.

Figure 7:
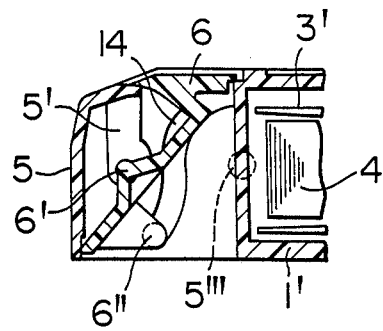
FIGS. 7 to 9 are illustrations of showing the opening and closing of the front and rear covers of the standard tape cassette.
Figure 8:
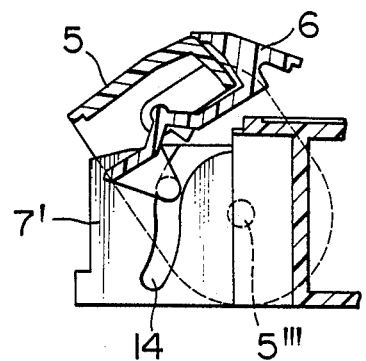
Figure 9:
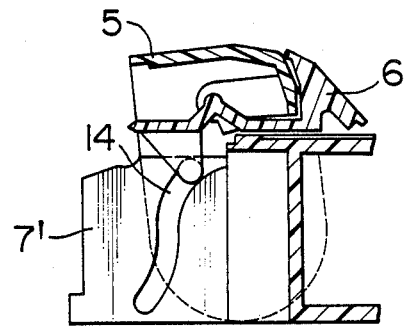

FIGS. 7 to 9 are sectional views showing the detail of the opening and closing operations of the front and rear covers 5 and 6. More specifically, FIG. 7 is a sectional view taken along the line VII—VII, while FIGS. 8 and 9 are sectional views taken along the line VIII—VIII. The front cover 5 is pivotally supported at the opposite front sides of the tape cassette 1. Reference numeral 5'" designates a pivot shaft around which the front cover 5 swings, while 5' designates an arm which rotatably carries a pivot shaft 6' on the rear cover 6. The rear cover 6 has a projection 6" which engages with a guide groove 14 formed in each side wall 7' of the small aperture 7 formed in the standard tape cassette 1. The cover mechanism described hereinbefore is wholly biased by a resilient member into the state shown in FIG. 7, but is externally operable to move along a path as shown in FIGS. 8 and 9. The rear cover 6 is guided by the guide grooves 14 so that it can move smoothly between the opening and closing positions without contacting the tape 4'.

Figure 10:
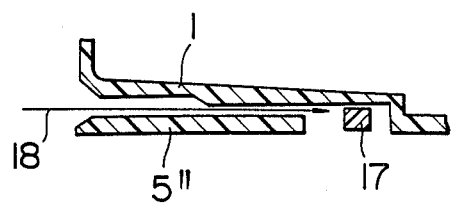
FIGS. 10 to 13 are illustrations of showing cover locking and cover opening operations associated with the standard tape cassette.
Figure 11:
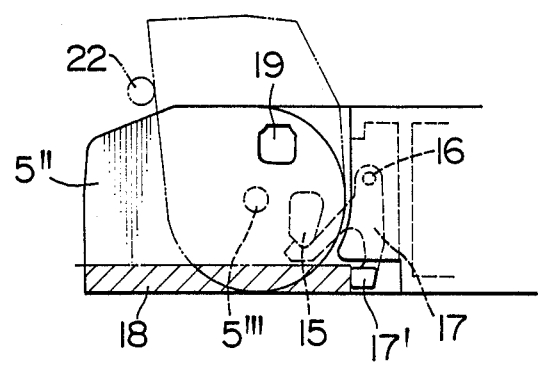

FIG. 10 is a schematic sectional view, while FIG. 11 is a side elevational view of a lock mechanism for locking the front and rear covers 5,6, provided in the vicinity of the left side portion of the front cover 5 shown in FIG. 1. The front cover 5 is swingable around the pivot shafts 5'" to a position shown by two-dot-and-dash line. However, swinging movement of the front cover 5 is limited because projections 15 provided inwardly of the left side surfaces 5" of the front cover 5 is stopped in the vicinity of the pivot shafts 5'" by a locking claw 17 rotatable about a shaft 16. As a projection (not shown) serving as a releasing member for releasing the cover locking claw 17 is moved into the hatched portion in FIG. 11 in the direction of the arrow in FIG. 10, it comes into contact with a releasing tab 17' on the cover locking claw 17 which is biased clockwise by a resilient member (not shown). Thereby, the front cover 5 is unlocked to become free. Consequently, a rectangular hole 19 provided in the left side wall 5" of the front cover 5 passes therethrough the light path 12 leading from the light-emitting element explained before in connection with FIG. 5 when the front cover 5 is opened. When the front cover 5 is closed, the left side wall 5" interrupts the light path. Needless to say, the standard tape cassette has an almost symmetrical form, so that functions including the opening and interruption of the light path are provided on both sides of the tape cassette, except that the cover locking mechanism is provided on only one side of the tape cassette.

Figure 12:
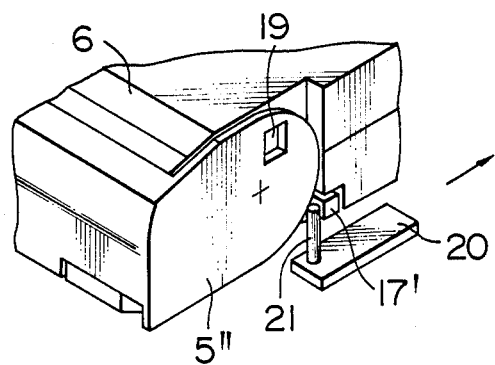
Figure 13:
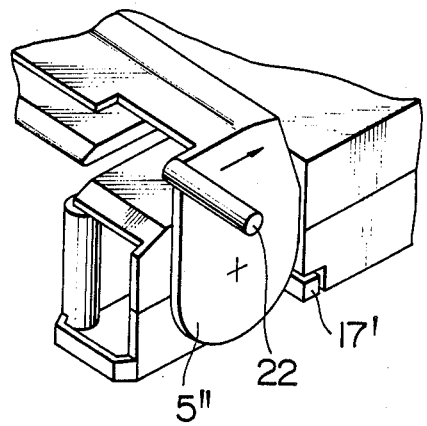

FIGS. 12 and 13 are perspective views showing how the front and rear covers are opened and closed.

Referring to FIG. 12, a slide plate 20 and a slide pin 21 which are provided on the body of VTR and movable relative to the standard tape cassette act to turn the releasing tab 17' on the cover locking claw 17 counterclockwise, thus unlocking the cover.

FIG. 13 shows the standard tape cassette 1 with the front and rear covers 5 and 6 opened by the action of a cover opening pin 22 provided on the body of the VTR.

Figure 14:
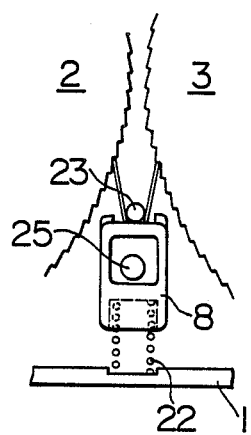
FIGS. 14 to 16 are illustrations of reel lock operations in the tape cassette.
Figure 15:
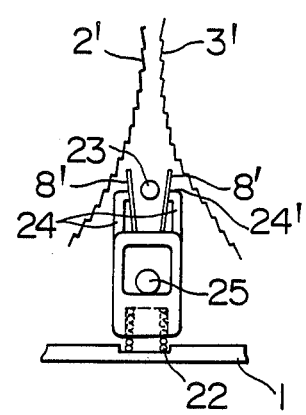
Figure 16:
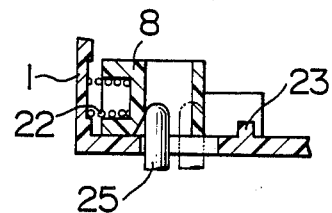

An explanation will be made hereinunder as to the operation of the reel lock 8. When the standard tape cassette 1 is not used, the reel lock 8 slides forwardly by the action of a lock spring 22 to cause the lock piece 8' on the end of the reel lock 8 to engage with the claws on the flanges 2',3' of the reels 2,3. The claws on the flanges 2',3' are so shaped as to allow the reels 2,3, when engaged by the lock piece 8', to rotate only in the tape winding up directions. Referring to FIG. 14, a projection 23 serves as a stopper for the reel lock 8 which is forwardly biased by the lock spring 22. Reference numeral 24 designates a lock guide having end 24' which acts to forcibly separate the lock pieces 8' on the end of the reel lock 8 from the claws on the flanges 2',3' of the reels 2,3, when the reel lock 8 is retracted by the lock spring 22 as shown in FIG. 15. The left and right side walls of the lock guide 24 serve to slidably guide the reel lock 8. Although not shown, the reel lock 8 is guided at its left and right sides by the lock guide 24, at its lower surface by the lower half or bottom part of the standard tape cassette 1 and at its upper surface by the upper half of the cassette. As shown in FIG. 16 showing this arrangement in section, a reel lock releasing pin 25 is provided on the VTR body and is movable from the position of imaginary line to the position of solid line, as shown in FIGS. 14 and 15. In the state shown in FIG. 15, the reels 2,3 are released from the reel lock 8 to be rotatable freely.

The standard tape cassette described hereinbefore gives a base to the invention. This standard tape cassette can be obtained by adding a rear cover to existing tape cassettes such as VHS-type tape cassettes and beta-type tape cassettes, thus ensuring a perfect seal of the tape when the tape cassette is not used. Namely, the invention provides a short-time recording tape cassette which ensures an interchangeability with the described standard tape cassette, and affords miniaturization of the VTR mechanism unattainable with the standard tape cassette, without impairing the excellent sealing performance and other advantages of the standard tape cassette.

Figure 17:
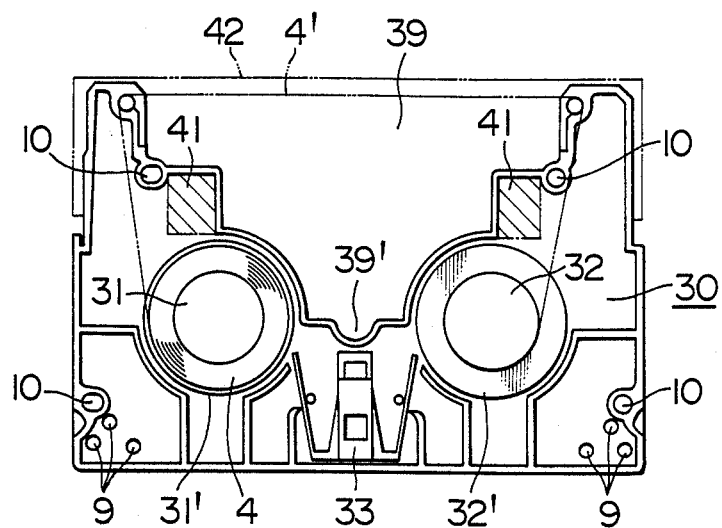
FIG. 17 is a plan view of a short-time recording tape cassette in accordance with the invention.

FIG. 17 is a plan view schematically showing the internal construction of a short-time recording cassette (referred to as 'short-time cassette', hereinunder), while FIG. 4 is a perspective view of the same turned upside down. It will be seen that the short-time cassette 30 has almost the same appearance as the standard cassette 1. Only the constitutional differences which discriminate the short-time cassette from the standard tape cassette will be described hereinunder. Reels 31,32 have flanges 31',32' the diameter of which is small owing to short recording time. The reels 31,32, however, are functionally equivalent to the reels of the standard tape cassette in all other respects. Thus, these reels 31,32 are provided on the outer peripheries thereof with claws (see FIG. 21) engageable with the reel lock 33. The construction and operation of the reel lock 33 are shown in FIGS. 18 to 21. FIG. 21 shows the state of the reel lock 33 when the short-time cassette is not used. In this state, a lock claws 33' engage with the claws on the flanges 31',32' as in the case of the standard tape cassette 1. The shapes and positions of the reel lock 33, lock spring 34, projection 35 and the lock guide 36 are changed in accordnce with reduction in the diameter of the reel flanges 31',32'. The functions of these parts, however, are equivalent to those of the standard tape cassette.

Figure 20:
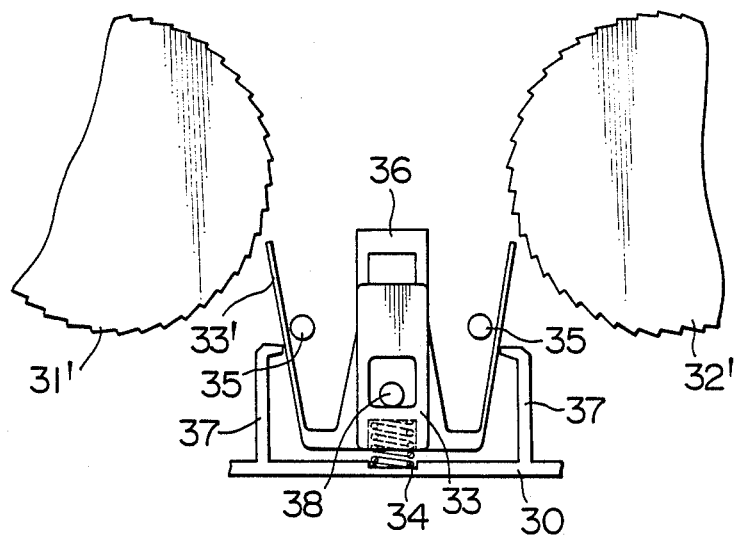
Figure 21:
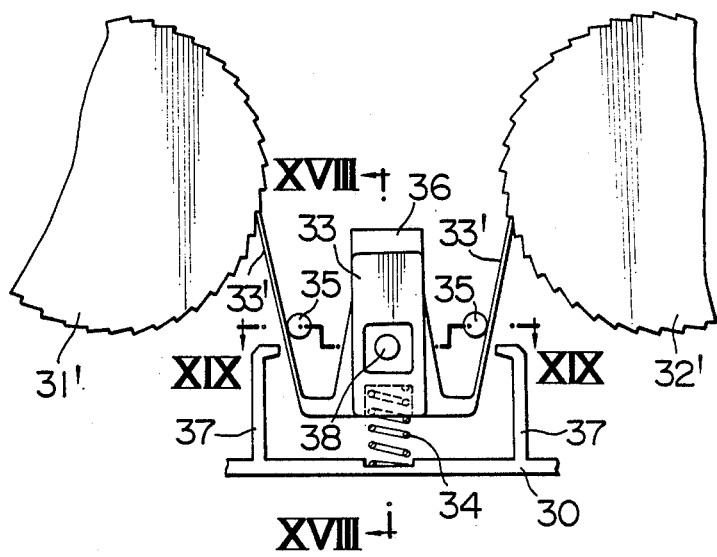

As showing in FIG. 20, when the reels 31,32 are unlocked by the lock releasing pin 38 provided on the VTR, a lock claw support 37 forcibly flexes the lock claw 33' to positively separate the same from the reel flanges 31', 32'.

Figure 18:
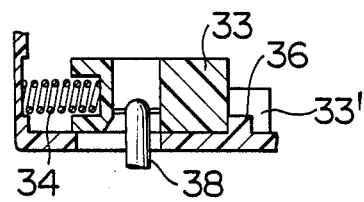
FIGS. 18 to 21 are illustrations showing the reel lock operations in the short-time recording tape cassette.
Figure 19:
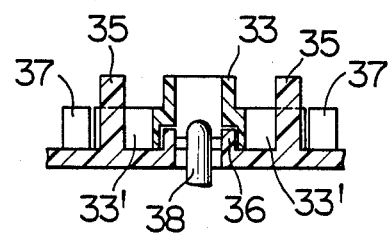

FIG. 18 is a sectional view taken along the line XVIII—XVIII in FIG. 21, while FIG. 19 is a sectional view taken along the line XIX—XIX in FIG. 21. The reel lock 33 is adapted to slide back and forth, while being guided at its upper and lower surfaces by the upper and lower half parts of the cassette, respectivel.

Figure 30:
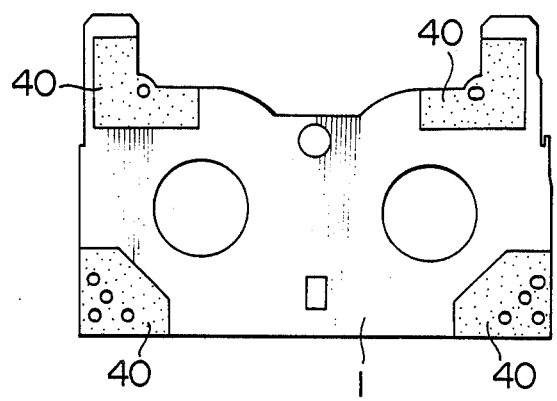
FIG. 30 is bottom plan view of a standard tape cassette.

Referring back to FIG. 17, since the diameters of the flanges 31',32' of the reels 31,32 are reduced, the size of the aperture 39 designed for allowing the post and the like to be inserted inwardly of the tape portion 4' stretched on the front of the cassette for withdrawal of the tape, is substantially enlarged as compared with the small aperture 7 formed in the standard tape cassette 1. More specifically, the aperture 39 has an area large enough to cover the small aperture 7 in the tape cassette 1 shown in FIGS. 2 and 5. The aperture 39, therefore, will be referred to as "large aperture", hereinunder. A recess 39' contiguous to the large aperture 39 and opened to the bottom surface is provided at a position perpendicular to and behind the tape 4,4' stretched at a given position in front of the sensor hole 11 (see FIGS. 2, 5 and 23,24) opened in the bottom of the standard tape cassette 1. The hatched areas 41 in FIG. 17 might be removed to constitute a part of the large aperture 39. However, since these areas overlap the support areas 40 of the standard tape cassette 1, shown by stippling in FIG. 30, which is supported by the VTR apparatus, the hatched areas 41 are left uncut as shown in FIG. 17, in terms of interchangeability.

Figure 22:
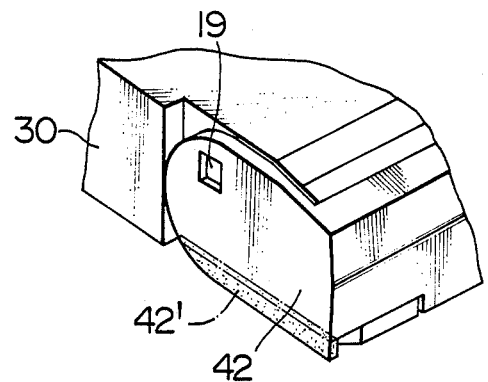
FIG. 22 is a perspective view of the front cover of the short-time tape cassette.

FIG. 22 is a perspective view of the front cover 42 as viewed from the right side. As shown in this Figure, unlike the standard tape cassette 1, the front cover 42 of the short-time cassette 30 is cut out at the stippled area 42' on the right side thereof. As will be described hereinafter, this arrangement is intended for the discrimination between the standard tape cassette 1 and the short-time cassette 30. For instance, a switch is provided on the portion of the garage holder on the VTR apparatus facing the cut 42', such that the switch operates when a standard tape cassette 1 is mounted but does not operate when a short-time cassette 30 is mounted. This switch mechanism is not shown in the case of the described embodiment, but the cut is used for the switching-over of the operation of mechanism, as will be fully described later.

The short-time cassette 30 described hereinabove has all the features and functions required for the standard tape cassette 1, and has the same specifications such as the reel axis distance, tape stretching position, outside dimensions of cassette body and so forth as those of the standard tape cassette 1. Thus, the short-time cassette 30 enjoys a perfect interchangeability with the standard tape cassette 1. However, the cassette 30 itself is not at all miniaturized. However, it is to be noted that the object of the invention is not to miniaturize the tape cassette itself but is to miniaturize the entire mechanism which uses the present tape cassette. A practical embodiment will be described hereinunder with reference to FIGS. 23 to 29. This embodiment employs a novel system unattainable with the conventional way of thinking which is directed to miniaturizing the mechanism by miniaturization of the tape cassette itself. More specifically, the system enables using a single VTR both for the standard tape cassette and the short-time cassette, such that, in the case of long-time recording, the standard tape cassette is used to need the mechanism of the same size as that of the standard VTR, whereas, in the case of short-time recording, the short-time cassette is used with much reduced size of the mechanism.

Figure 23:
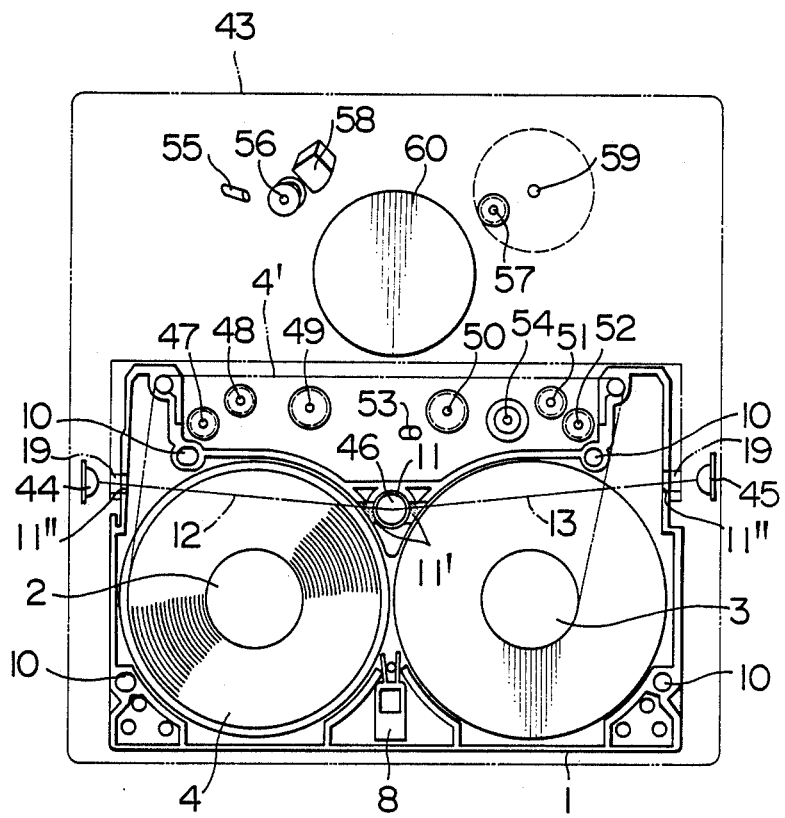
FIG. 23 is a plan view of a standard tape cassette mounted on a VTR.
Figure 24:
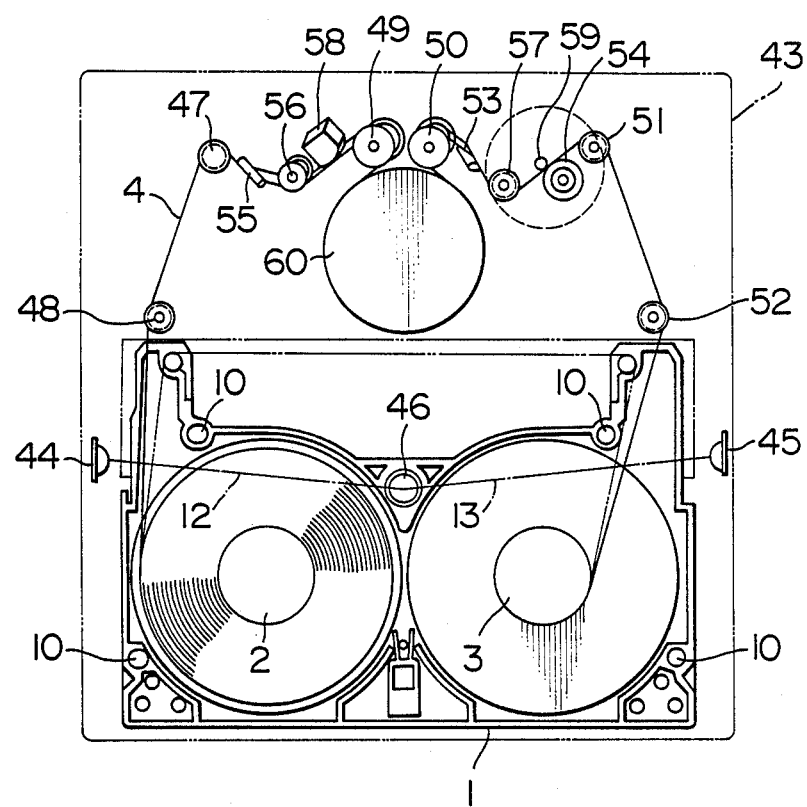
FIG. 24 is an illustration showing tape loading in the standard tape cassette mounted on the VTR.

FIG. 23 shows the state in which a standard tape cassette 1 is set on a VTR 43 in compliance with the request for a long-time recording. Numerals 44 and 45 designate light-receiving elements corresponding to the light-emitting element 46 disposed in the sensor hole 11. These elements in combination form light paths 12,13 for the purpose of detection of the terminal ends of the tape 4. Therefore, the portion 11' of the side wall of the cassette is made of a transparent material, while a notch is formed at 11" in the side wall. Reference numerals 47, 48, 49, 50, 51 and 52 designate rotary posts for forming a tape path, 53 a stationary post and 54 a pinch roller 54. Reference numeral 55 designates a stationary post, while numerals 56 and 57 designate rotary posts. Numerals 58, 59 and 60, respectively, designate an erasehead, capstan and a tape guide drum. With the standard tape cassette 1 mounted on the VTR in the manner described, a loading motor (not shown) is energized and the posts 47 to 53 and the pinch roller 54 in the small aperture 7 continue a tape loading operation while taking out the stretched tape 4' to a predetermined position. FIG. 24 shows the state in which tape loading is completed. The tape 4 is wound a predetermined angle about the tape guide drum 60 and is pinched between the capstan 59 and the pinch roller 54 to be driven.

Figure 25:
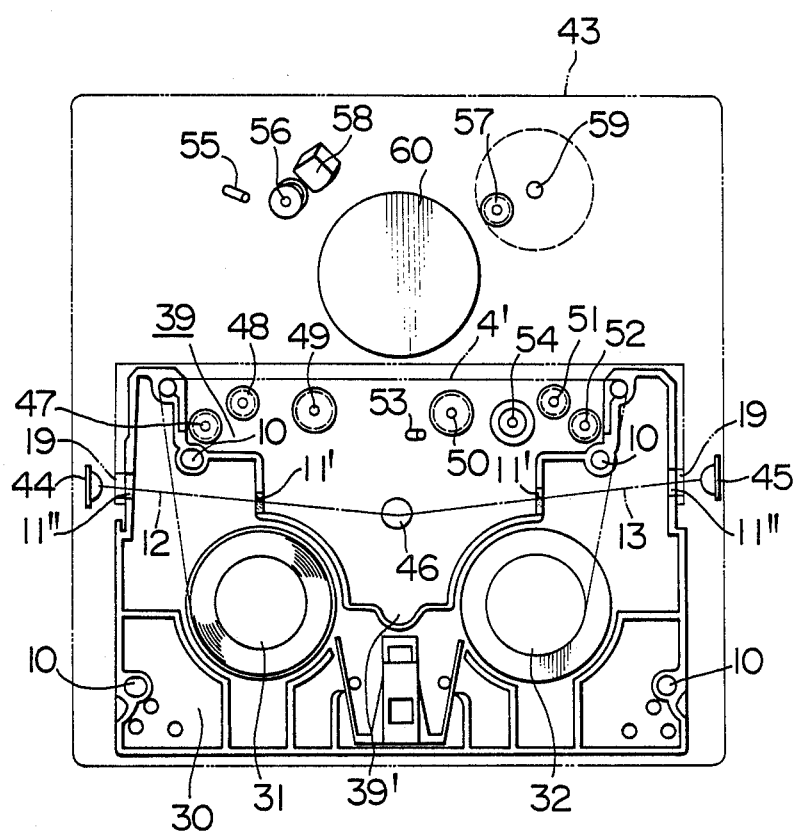
FIG. 25 is a plan view of a short-time recording tape cassette mounted on a VTR.

FIG. 25 shows the state in which the VTR 43 receives a short-time cassette 30 in accordance with the invention. The large aperture 39 of the short-time cassette 30 extends over the extent of the small aperture 7 of the standard tape cassette 1, so that it can naturally accommodate the posts 47 to 53 and the capstan 54.

The light paths connecting the light emitting element 46 to the light-receiving elements 44,45 are the same as those in the standard tape cassette 1. Since the portion 11' of the cassette wall is transparent and the portion 11″ is notched, the light can pass through them. If the mechanism is constructed such that the posts can move the tape to the predetermined loading position in the same way as the case with the standard tape cassette 1, the operation of the mechanism is identical to that shown in FIG. 24. This means that the short-time cassette 30 is interchangeable with the standard tape cassette 1.

Figure 26:
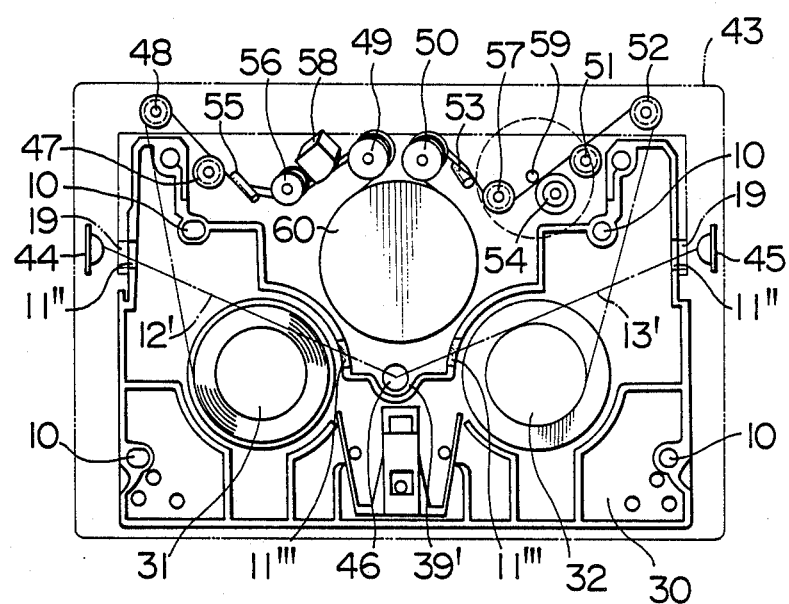
FIG. 26 is an illustration showing tape loading in the short-time recording tape cassette mounted on the VTR.

In the instant embodiment, the short-time cassette 30 is used to form the tape path as shown in FIG. 26. The portion of the tape path centering around the tape guide drum 60 is the same as that for the standard tape cassette 1 except that the respective posts, capstan and the tape guide drum lying between the posts 47 and 51 are relatively near the short-time cassette 30, and the whole parts of the tape path as well as the tape guide drum 60 is accommodated by the large aperture 39 of the short-time cassette 30. Meanwhile, the light emitting element 46 having been positioned at the center of the tape cassette before the loading operation as shown in FIG. 25 is displaced into the recess 39′ as shown in FIG. 26, as a result of movement of the tape guide drum 60 into the large aperture 39. Namely, the light emitting element 46 is moved from the position corresponding to the sensor hole 11 when the standard tape cassette 1 is mounted as shown in FIGS. 23 to 24, i.e., from the position of the light-emitting element 46 shown in FIG. 25, into the position in the recess 39′ which is perpendicular to and behind the tape 4′ stretched on the front of the cassette a shown in FIG. 25 and extends from the large aperture 39 to be opened to the bottom of the short-time cassette 30 as shown in FIG. 26. Therefore, new light paths 12′,13′ are formed. However, the positions and shape of the rectangular holes 19 formed in the front cover 42 of the short-time cassette 30 are identical to those of the standard tape cassette 1, and the new light paths 12′,13′ pass through the rectangular holes 19 and are associated with the light receiving elements 44,45. The portion 11‴of the side wall of the short-time cassette 30 defining the large aperture 30 is transparent to transmit the light, while the portion 11″ is provided with a notch as in the case of the standard tape cassette 1. As will be understood from the foregoing description, it is possible to miniaturize the VTR 43 by reducing the size of the mechanism while maintaining all the functions used when the standard tape cassette 1 is used, by using the short-time cassette 30 such that it relatively approaches the tape guide drum 60.

A practical example of the VTR mechanism in which the tape path shown in FIGS. 24 to 26 is finished will be described in connection with FIGS. 27 to 29. The VTR has a driving base plate 61, a loading base plate 62 and a loading guide 63 superposed on and fixed to the loading base plate 62. The driving base plate 61 has reel bases 64, 65 adapted for engagement with the reels 2,3,31,32 of the tape cassettes for driving the tape on the cassette, element holders 66,67 for securing thereon the light-receiving elements 44,45, positioning pins 68,69 for engagement with the cassette positioning holes 10, cassette support pins 70,71 for supporting the cassette support area 40 (see FIG. 30), cassette information switches 72,73 associated with the cassette information windows 9 for detecting whether these six windows are opened or closed, a reel lock lever 75 having a reel lock releasing pin 25 for reel locks 8,33 rotatable about the support shaft 74, an element lever 77 for supporting the light-emitting element 46 for rotation about the support shaft 76, and a first post arm 80 and a second post arm 81 carrying the posts 48 and 52 at their one ends and rotatably carried about the support shafts 78 and 79.

The loading base plate 62 includes a first stopper 82 for positioning the tape guide drum 60, capstan 59, posts 55,56,57, erase head 58 and the posts 49,50, a second stopper 83 for positioning the pinch roller port defined by the post 51 and the pinch roller 54, and a third stopper 84 for positioning the post 47. The pinch roller 54 is rotatable about the shaft 85.

Figure 29:
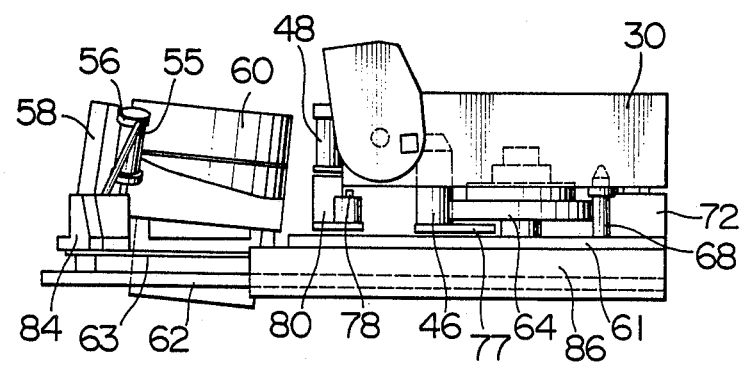
FIG. 29 is a side elevational view of the VTR.

FIG. 29 shows this VTR mechanism in side elevation. The loading base plate 62 is supported by a pair of U-shaped base plate guides 86,87 provided on the opposite sides of the driving base plate 61, and is slidable back and forth along the base plate guides 86 and 87.

Figure 27:
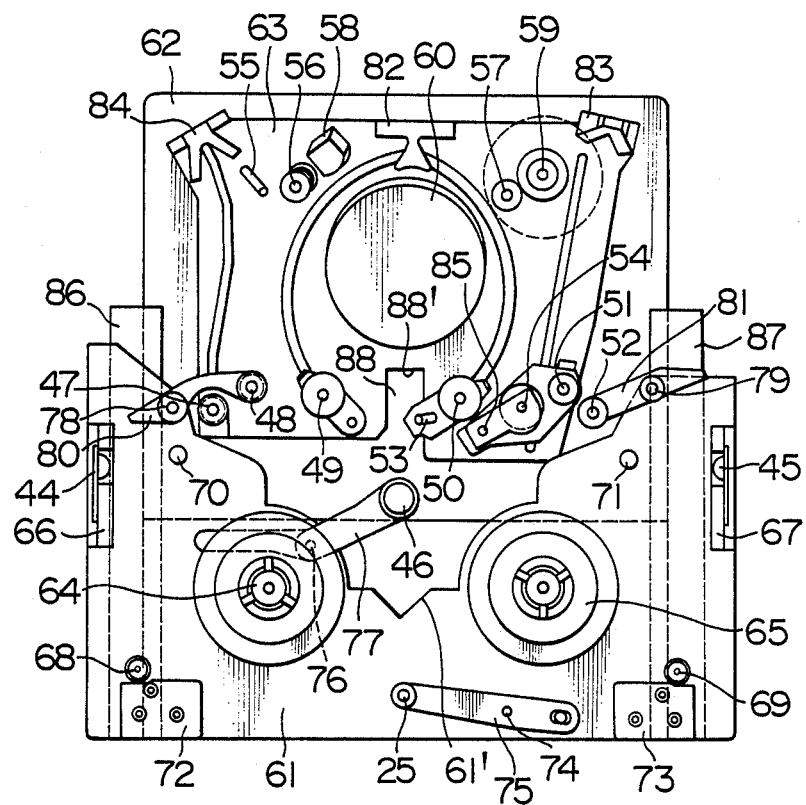
FIG. 27 is a plan view of a VTR for short-time tape cassette of the invention, in the state before loading.
Figure 28:
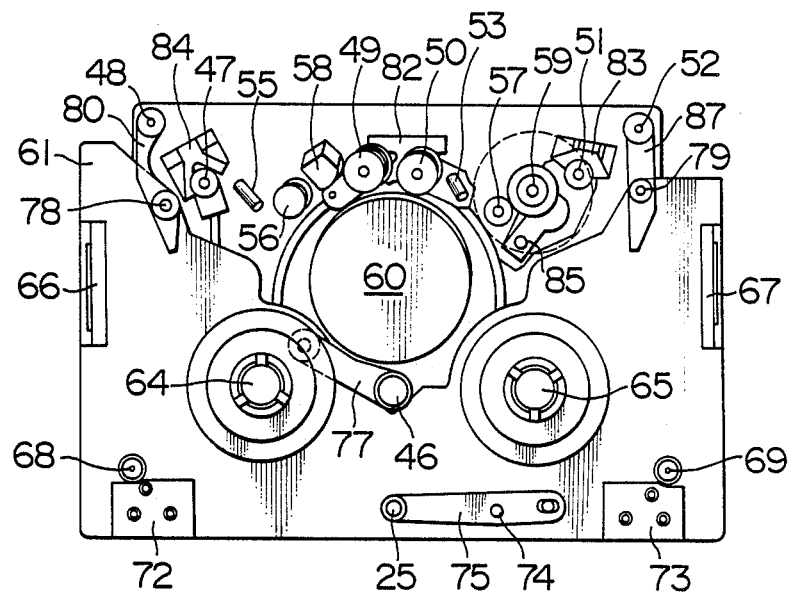
FIG. 28 is a plan view of the VTR after the completion of the loading.

Although not illustrated, the loading base plate 62 and the driving base plate 61 are locked in the positional relationship shown in FIG. 27.

After the standard tape cassette 1 is mounted on the VTR, the loading motor (not shown) is actuated to turn the first and second post arms 80 and 81, respectively, counter-clockwise and clockwise about the support shafts 78 and 79, respectively, and to move the post 47 along the guide groove 88 in the loading guide base plate 63. Meanwhile, the other posts 49, 50, 53 and 51 and the pinch roller 54 are also moved along the guide grooves 89, 90 and 91, thus completing the tape path as shown in FIG. 24.

The short-time cassette 30 is cut out in the front cover 42 as shown in FIG. 22, unlike the standard tape cassette 1. Therefore, the mounting of the short-time cassette 30 on the VTR is detected by, for example, a microswitch responsive to the presence of the cut to identify the short-time cassette 30.

As the mounted tape cassette is identified by the microswitch (not shown) to be the short-time cassette 30, the loading base plate 62 and the driving base plate 61 are unlocked to become slidable. Then, as the loading motor is started, the posts mentioned before are moved and, at the same time, the loading base plate 62 is moved towards the driving base plate 61 along the base plate guides 86,87 along with the movement of the respective posts. When the loading base plate 62 has reached a predetermined position, the loading base plate 62 is locked again with respect to the driving base plate 61, so that the loading motor is stopped. At this moment, the respective posts reach and are positioned by the respective stoppers.

The light emitting element 46 carried by the element lever 77 is usually urged resiliently to take the state shown in FIG. 27. As the loading base plate 62 moves, the element lever 77 is rotated about the support shaft 76 as it is pushed by the end 88′ of a U-shaped groove 88 formed in one end of the loading guide 63 superposed on the loading base plate 62. In the state in which the loading has been completed, the light emitting element 46 is positioned by a V-groove 61′ formed in a portion of the driving base plate 61. At the same time, the light-emitting element 46 is positioned with respect to the short-time cassette to be received in the recess 39′ which is formed in the short-time cassette 30 as shown in FIG. 26.

Thus, the VTR can be applied on two types of tape cassette, i.e., a standard tape cassette and a short-time cassette, because the recess 39′ contiguous to the aperture 39 in the short-time cassette 30 accommodates the light-emitting element 46 to form the light paths 13,13′ (see FIGS. 24 and 26) for the detection of the terminal ends of the tape 4. The above arrangement eliminates problems involved in an alternative arrangement in which two light-emitting elements are provided for exclusive use, and in which the VTR itself is increased in thickness and parts is increased in number to make the mechanism complicated since upon the use of one type of tape cassette the light-emitting element for the other type of tape cassette must be withdrawn downward to clear space for the one type of tape cassette. After a series of operations described hereinbefore, the mechanism is locked in the position shown in FIG. 28, thus completing the tape path as shown in FIG. 26.

For ejecting the tape cassette 1 or 30, the above-described operation is reversed so as to realize the positional relationship shown in FIG. 25.

As has been described, in thie embodiment of the invention, the same VTR can operate with both the standard tape cassette 1 and the sort-time cassette 30. In addition, in the case of the short-time cassette 30, the minimal size of the mechanism can be attained. However, if the VTR is intended for use only with the short-time cassette 30, it is not necessary to use the arrangement for moving the element holder 46: namely, the element holder 46 may be fixed at the position shown in FIG. 28.

The invention offers the following advantages over the conventional ½ inch VHS-C type system and ¾ inch type system.

Advantages over ½ inch VHS-C system are as follows:

(1) An adapter cassette is not needed. This relieves the users not only from the financial burden purchasing the adapter tape cassette but also from the troublesome operation of mounting and demounting of the short-time tape cassette on and from the adapter cassette. When taking the short-time tape cassette into consideration, the fact that adapter cassettes are not needed eliminates any limitation in the design of the short-time tape cassette, and optimum design becomes possible for the perfect tape sealing mechanism, front cover locking mechanism, and gears are not needed in the reel arrangement. In addition, it is not necessary to excessively reduce the thickness of the mechanism since the two types of tape cassettes are the same in thickness. In general, the short-time cassette set in an adapter cassette provides an inferior quality of the picture as compared with the standard tape cassette, due to difference in the tape tension which is attributable to the difference in number and positions of the guide posts and tape wound angle. According to the invention, this problem is overcome because the adapter cassette is not used. The undesirable effect on the tape running system such as wow and flutter and distortion of the picture, attributable to the driving of the take-up reel through the intermediate gear in the adapter cassette, is also avoided.

(2) The VTR can be designed to afford an interchangeability between two types of tape cassettes. In the case of the conventional VHS-C type system, the short-time cassette and the standard tape cassette have different sizes. Therefore, although the short-time cassette can be used in a VTR designed for the standard tape cassette through the aid of an adapter cassette, it is not possible to use the standard tape cassette on a VTR designed for the short-time cassette. In contrast, according to the invention, the VTR can be designed commonly for use with both types of tape cassettes. In addition, the object of the invention aiming at miniaturization of the mechanism can be attained by the use of the short-time cassette. Hitherto, with the VHS-C type system, the user has been obliged to purchase both the VTRs exlusive for the standard tape cassette and the short-time cassette, in order to fully enjoy the merits of these tape cassettes, which economically burdens the user. According to the invention, this problem is overcome because the same VTR is usable for both types of tape cassette. In addition, the user can use the standard tape cassette and the short time tape cassette in the same way, without noticing any difference.

Advantages over ¾ inch system are as follows:

(1) According to the ¾ inch type system, the short-time cassette has the same reel axis distance as the standard tape cassette, although the external size of the tape cassette is reduced slightly owing to the reduction in the reel flange diameter. Namely, in this system, it is not possible to largely decrease the cassette size. In addition, the reduction in the size of the mechanism is limited because it relies solely upon the reduction in the size of the tape cassette. According to the invention, however, a large miniaturization effect is attained because the mechanism is accommodated by the aperture formed in the tape cassette.

(2) In the case of the ¾ inch type system, the interchangeability between the standard tape cassette and the short-time cassette is obtainable without the use of adapter cassettes. However, since the standard and short-time tape cassettes have different sizes, it is not possible to position the tape cassettes in the cassette holder on the basis of the external size of the tape cassettes, so that a guide groove is formed in the bottom surface of the cassettes. According to the invention, however, there is no need for such a guide groove because both types of tape cassette have an identical external size, so that the thickness of the mechanism can be reduced sufficiently. The invention also eliminates the necessity for a projection provided on the cassette holder for matching with the guide groove. According to the invention, the tape cassettes can be mounted easily and precisely in the cassette holder, because they are positioned on the basis of their external size.

(3) In the ¾ inch type system, when a short-time tape cassette is mounted in the cassette holder of a VTR designed for the standard tape cassette, the short-time tape cassette has to be inserted deeply into the holder since the short-time tape cassette is small in width and depth. The insertion to such a large depth is considerably troublesome. Withdrawal of the short-time cassette is more difficult than insertion thereof. Namely, although the short-time cassette can be removed by holding a finger on a notch formed in the cassette, such a way of withdrawal is not good in operability. According to the invention, however, it is not necessary to provide any such specific measures, and the short-time cassette can be handled exactly in the same way as the standard tape cassette.

(4) The VTR can be designed for affording an interchangeability between both types of tape cassette. As in the case of the VHS-C type system, the miniaturization of the tape cassette in the ¾ inch type system is intended, so that the VTR designed for the short-time cassette can mount only the short-time cassette. In contrast, according to the invention, a VTR which can operate both with the standard tape cassette and the short-time tape cassette can be designed without difficulty to prove of a large economic profit to the users.

In the described embodiment, the short-time cassette is designed to allow the formation of two light paths for the detection of the terminal ends of the tape, so that the light-emitting element is moved to allow the mechanism as a whole to be effectively accommodated by the aperture, thus contributing to the miniaturization of the whole mechanism.

As has been described, the invention offers a novel idea for miniaturization of the mechanism, unlike the conventional systems in which the miniaturization of the mechanism relies upon the reduction in the size of the tape cassette itself. Standard tape cassettes used in existing systems, such as VHS type system, and ½ inch and ¾ inch cassette used in beta system have considerably large sizes. However, if the size of the standard tape cassette is appropriate from the view point of handling, a further reduction in the size of the tape cassette may impair the handling undesirably. The invention, which makes use of the short-time cassette of the same size as the standard tape cassette, is free from this problem.

A description will be made hereinunder as to another embodiment of the invention which does not require provision of the transparent members 11″,11‴ shown in FIGS. 25 and 26 as means for constituting the light paths 13,13′ for the detection of the terminal ends of the tape 4.

Figure 31:
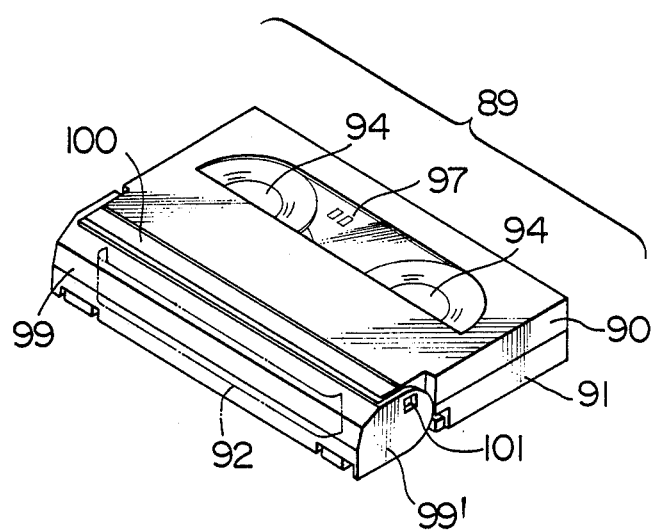
FIG. 31 is a perspective view of another embodiment.
Figure 32:
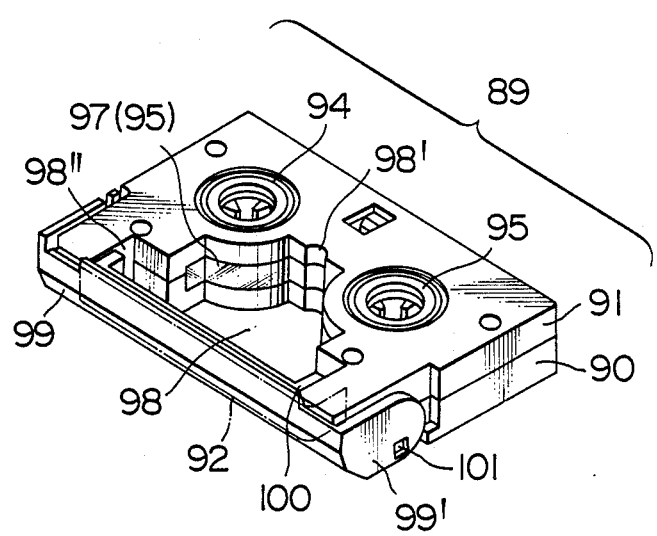
FIG. 32 is a perspective view of the embodiment shown in FIG. 31 turned upside down.
Figure 33:
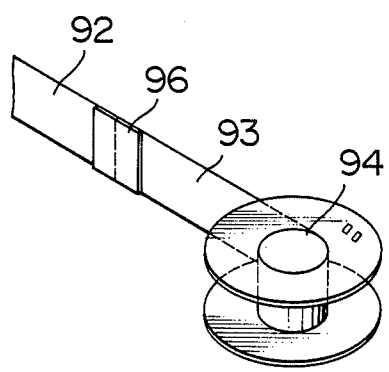
FIG. 33 is a perspective view of the constituents of the embodiment FIG. 31.
Figure 34:
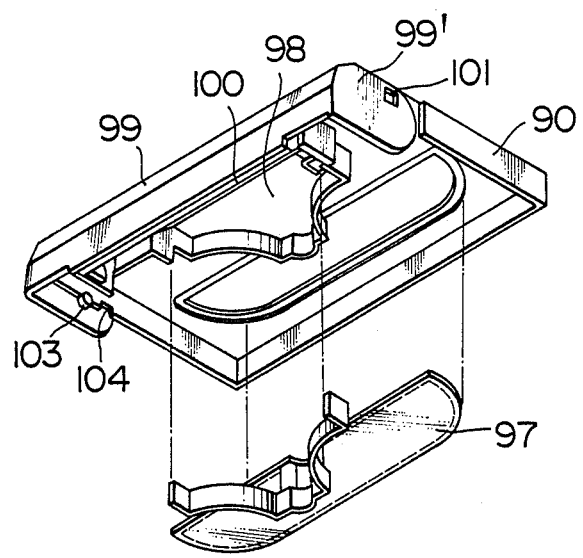
FIG. 34 is an exploded perspective view of an essential part of shown in FIG. 31.
Figure 35:
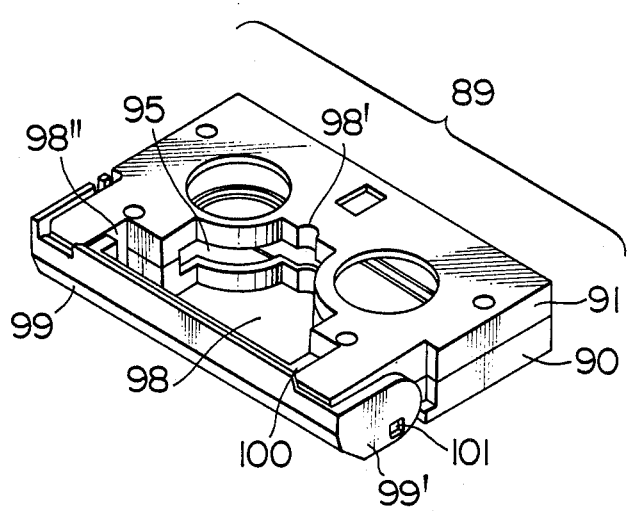
FIG. 35 is a perspective view of the constituents of the embodiment shown in FIG. 31.
Figure 36:
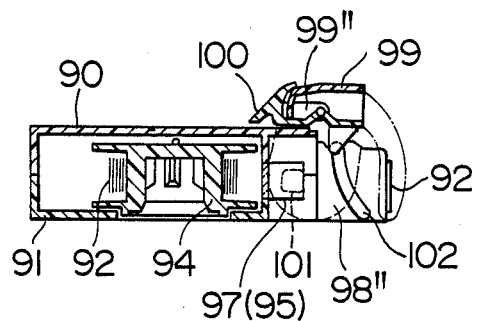
FIG. 36 is a sectional view showing the operation of the constituents of the embodiment shown in FIG. 31.
Figure 37:
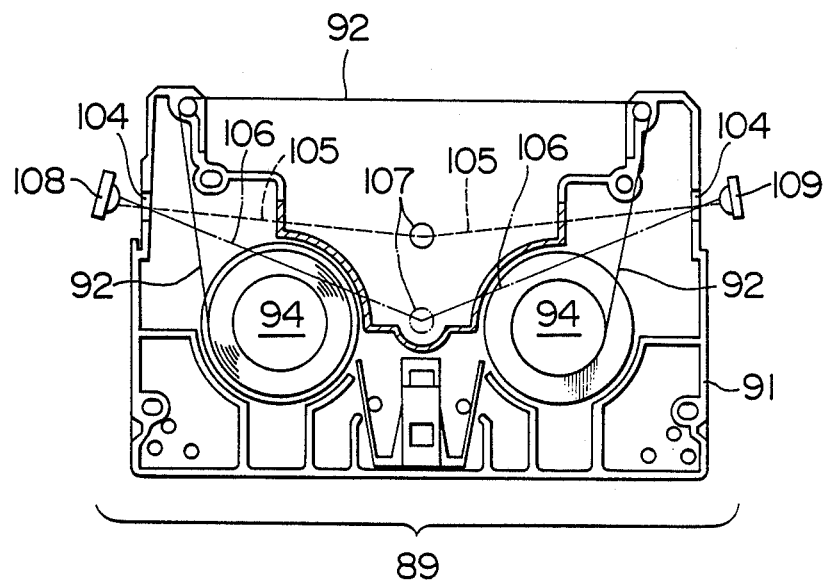
FIG. 37 is a schematic plan view showing the internal structure of the embodiment shown in FIG. 31.
Figure 38:
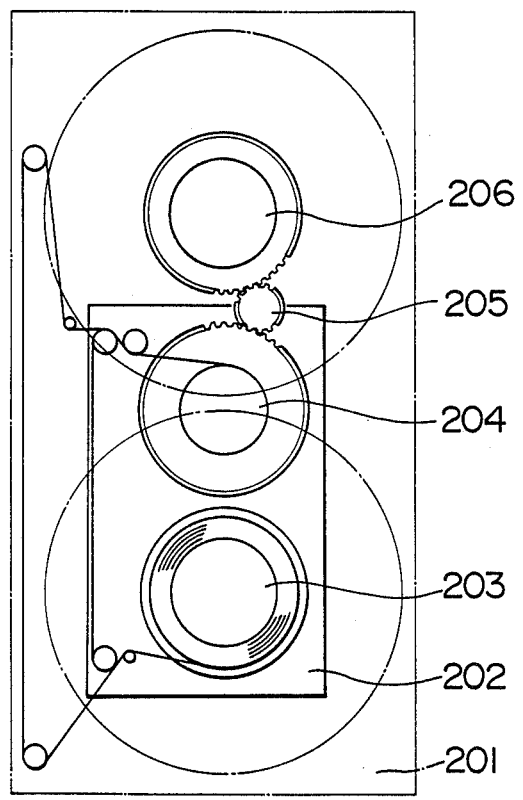
FIGS. 38 and 39 are plan views of a conventional VHS-C type tape cassette and a conventional ¾ inch tape cassette.

FIGS. 31 and 32 are perspective views of another embodiment of a short-time cassette 89 as viewed from above and below, while FIG. 33 is a perspective view of one reel of a pair of reels 94 provided within the short-time cassette. FIG. 34 is an exploded perspective view showing a positional relationship between an upper half part 90 of the short-time cassette casing 90,91 and a light-transmitting window member 97. FIG. 35 is a perspective view of the short-time cassette, showing mainly the casing 90,91 thereof with the window member 97 and the reels 94 removed. FIG. 36 is a schematic sectional view showing the operation of a front cover 99 and a rear cover 100 which covers the front and rear sides of a tape 99 stretched in front of the cassette. FIG. 37 is a schematic plan view of the short-time cassette showing the internal structure, with the upper half part 90 of the casing 90,91 and the front and rear covers 99,100 removed for better understanding.

Referring to FIGS. 31 to 34, a length of tape 92 is stretched on the front side of a cassette casing constituted by an upper and lower half parts 90,91, as shown by one-dot-and-dash line in FIGS. 31 and 32. The terminal ends of the tape 92 are anchored to a pair of reels 94 (only one of them is shown) through detection tapes 93 which has a different light transmission coefficient from that of the tape 92. The tape 92 and the detection tape 93 are connected to each other through a splicing tape 96. The pair of reels 94 are housed by the cassette casing 90,91, and the length of the tape 92 wound about each reel 94 can be detected through a light-transmitting window member 97. The window member 97 has a form as shown in FIG. 34. As seen from FIGS. 32 and 35, the window member 97 is located at a position suitable for the detection of the length of the tape 92 on the pair of reels and, in addition, constitutes a part of the walls which define an aperture 98 opened to the bottom of the short-time cassette 89, while covering light transmitting holes 95 formed in the walls for light paths 105,106 to be described hereinafter. The fixing of the window member 97 to the upper half part 90 is made by a suitable known method such as supersonic-wave welding.

Provision of this window member 97 enables rendering the wall of the aperture 98 transparent at any desired height and position. In FIG. 32, a recess 98′ is provided in the terminating end of the aperture 98 for clearing space for the light-emitting element 107 as in the case of the preceding embodiment.

The tape 92 stretched on the front side of the tape cassette is normally covered by front and rear covers 99 and 100 which will be described hereinunder with specific reference to FIGS. 36, as well as to FIGS. 32 and 34. As seen from FIG. 34, the front cover 99 is pivotally supported at its both lateral ends on the cassette casing halves 90,91 by means of shafts 103 provided on the inner sides of the side panels 99′ thereof. When in the closed position, the side panels 99′ cover right and left notches 104 provided in the upper and lower casing halves 90,91 of the casing so as to form the light paths 105,106 (see FIG. 37) to be described later. In this Figure, only the notch 104 in one side of the upper casing half 90 is shown. However, when in the opened position as shown in FIG. 36, light path holes 101 provided in the side panels 99′ are moved to position facing the notches 104, so that the notches 104 shown in FIG. 34 are exposed to the outside of the short-time cassette 89, thus allowing the formation of the light paths 105,106 to be described later in connection with FIG. 37. On the other hand, holder arms 99″ are formed inside the aperture 98 of the front cover 99 to rotatably carry the rear cover 100. The rear cover 100 is guided by guide grooves 102 formed on the left nd right walls 98″ defining the aperture 98 to move in response to the movement of the front cover 99. More specifically, when the front cover 99 is turned to cover the front side of the tape 92 stretched on the front side of the cassette, the rear cover 100 also is turned along a path shown by one-dot-and-dash line and covering the rear side of the tape 92. Therefore, the tape 92 is protected from contaminants such as dust and other foreign matter, as well as from a touch by the user's finger.

An explanation will be made hereinunder as to the light paths 105,106 defined in the short-time cassette 89, with specific reference to FIG. 37. The instant embodiment employs a plurality of light paths 105 and 106. These light paths 105,106 are defined between the light-emitting element 107 which enters into the aperture 98 from the bottom when the short-time cassette 89 is mounted in the VTR (not shown) and a pair of light-receiving elements 108,109 which are provided at suitable positions of the VTR, i.e., on the extension of the line which connects the notches 104 through the tape 92 stretched in the cassette casing halves 90,91. In the instant embodiment, the light path 106 can be formed when the light-emitting element 107 is located at a position shown by the one-dot-and-dash line in FIG. 37. It is to be noted here that the hatched area in FIG. 37, constituting a part of the wall of the aperture 98, is covered by a portion which is constructed integral with the light-transmitting window members 97 corresponding to the light-transmitting holes 95 (see FIG. 7) as described before in connection with FIGS. 34 and 35. This hatched area, therefore, does not constitute a hindrance to the formation of the light paths 105,106, but effectively prevents dust and other foreign matter from coming into the cassette casing halves 90,91 since it constitutes a part of the wall of the aperture 98. The notches 104 are normally covered by the side panels 99′ of the front cover 99 as shown in FIGS. 31 and 32. However, as a result of the opening movement of the front cover 99 in response to the mounting of the tape cassette on the VTR (not shown), the light path holes 101 on the side panels 99′ are moved to the positions facing the notches 104, thus allowing the formation of the light paths 105 and 106.

The detection of the terminal ends of the tape 92 is conducted as follows. Normally, the light emanated from the light-transmitting element 107 cannot reach the light-receiving elements 108,109 since it is interrupted by the tape 92 which is stretched in the cassette case 90,91. However, when the tape runs to take the detection tape 93, having a higher light transmitting coefficient than the tape 92, to predetermined positions, the light reaches the light-receiving element 108 or 109, thus detecting the terminal ends of the tape 92. Upon detect of the tape ends, suitable control is effected such as to stop the running of the tape.

Thus, in the described embodiment of the invention, it is possible to prevent, in a short-time cassette, dust and other foreign matter from entering into the cassette casing while allowing the formation of light paths across the tape stretched in the cassette casing, by quite a simple construction in which the light-transmitting window members and the covers of the light paths are integral with each other. This feature offers a great advantage particularly in a miniaturized tape cassette which is often put in a pocket of the user's clothes which is full of dust.

What is claimed is:

1. A short-time recording tape cassette for use in a video tape recorder including at least one post for establishing a tape path, a tape guide drum, a capstan and a pinch roller, said short-time cassette comprising:
    a housing having upper and lower surfaces and front, rear and two side surfaces;
    a pair of short-time tape reels mounted in said housing; and
    a magnetic tape having a predetermined short-time length and having leading and terminal ends anchored respectively to said pair of tape reels;
    said housing defining a boundary adjacent said front side surface thereof, said boundary defining an opening space within said housing sufficiently large to accommodate the post, the tape guide drum, the capstan, the pinch roller and substantially the entire tape path when the short-time cassette is loaded in the video tape recorder.

2. The short-time cassette as in claim 1, wherein said boundary extends greater than half the distance between (i) a tape stretching position at said front side surface of said housing and (ii) said rear side surface of said housing.

* * * * *